(12) United States Patent
Moreno et al.

(10) Patent No.: US 12,141,160 B2
(45) Date of Patent: Nov. 12, 2024

(54) IN-FLIGHT TRANSFORMATIONS OVER A DATA STREAM

(71) Applicant: Capital One Services, LLC, McLean, VA (US)

(72) Inventors: Jose Moreno, Berkeley, CA (US);
Saianirudh Kantabathina, Fremont, CA (US); Sathi Chowdhury, San Ramon, CA (US); Selwyn Lehmann, Antioch, CA (US); Forrest Thomas, Walnut Creek, CA (US); David Woods, Pleasant Hill, CA (US); Richard Hightower, Dublin, CA (US); Scott Mandrell, San Francisco, CA (US); Mary Baum, San Francisco, CA (US); Patrick Ryan, Santa Clara, CA (US); Alec Sokol, San Francisco, CA (US); Michael Qiu, San Francisco, CA (US); Thomas J. O'Connor, San Francisco, CA (US); Navaneet Galagali, Fremont, CA (US); Daniel Liu, San Francisco, CA (US); Christopher Cellucci, Campbell, CA (US)

(73) Assignee: Capital One Services, LLC, McLean, VA (US)

( * ) Notice: Subject to any disclaimer, the term of this patent is extended or adjusted under 35 U.S.C. 154(b) by 1 day.

(21) Appl. No.: 17/012,965

(22) Filed: Sep. 4, 2020

(65) Prior Publication Data
US 2022/0075795 A1    Mar. 10, 2022

(51) Int. Cl.
*G06F 16/25*    (2019.01)
*G06F 16/2455*    (2019.01)

(52) U.S. Cl.
CPC ...... *G06F 16/258* (2019.01); *G06F 16/24568* (2019.01)

(58) Field of Classification Search
CPC .................. G06F 16/258; G06F 16/24568
See application file for complete search history.

(56) References Cited

U.S. PATENT DOCUMENTS

| | | | |
|---|---|---|---|
| 10,257,033 B2 | 4/2019 | Shimamura et al. | |
| 2018/0101429 A1* | 4/2018 | Melanchenko | ..... G06F 11/0772 |
| 2018/0101874 A1* | 4/2018 | Laski | ................. G06Q 30/0271 |
| 2018/0203744 A1 | 7/2018 | Wiesmaier et al. | |
| 2019/0014171 A1 | 1/2019 | Stein et al. | |

(Continued)

*Primary Examiner* — Richard L Bowen
*Assistant Examiner* — Aryan D Toughiry
(74) *Attorney, Agent, or Firm* — Sterne, Kessler, Goldstein & Fox P.L.L.C.

(57) ABSTRACT

Disclosed herein are system, method, and computer program product embodiments for performing in-flight transformations of data streams. Complex event processing (CEP) operating on event records from various data streams can operate by storing the streamed event record data in a database, and then querying the data to perform a data transformation. However, in order to improve the performance of the data transformations and streamline CEP, a serverless architecture is introduced that can perform data transformations directly on streams, using attributes of the streamed record data defined in a schema. The resulting transformed data can then be provided by the serverless architecture to the CEP for direct access of the data most needed by the CEP.

20 Claims, 5 Drawing Sheets

(56) References Cited

U.S. PATENT DOCUMENTS

| | | |
|---|---|---|
| 2019/0149480 A1 | 5/2019 | Singhvi et al. |
| 2020/0167360 A1* | 5/2020 | Rath ...................... G06F 3/061 |
| 2020/0402058 A1* | 12/2020 | Zhou ................... G06Q 20/385 |
| 2021/0004253 A1* | 1/2021 | Barnes ................. G06F 11/301 |
| 2021/0294587 A1* | 9/2021 | Jacobson ............ G06F 9/44505 |

* cited by examiner

IN-FLIGHT TRANSFORMATIONS OVER A DATA STREAM

BACKGROUND

As people go about their daily lives in the digital world, every transaction they engage in has the potential of generating information. This information has significant value in analyzing and understanding the behaviors of people engaging in such transactions. For this reason, large businesses have developed around the collection and rapid analysis of such data.

As more transactions are captured electronically, the number of transaction events and the sheer scope of data in these captures continues to grow dramatically. With so much transaction data available, it becomes possible to learn significantly more about the people participating in these transactions. However, at some point the vast amounts of data needing analysis becomes a performance bottleneck.

For this reason, it is desirable to provide techniques to improve the speed and quality of collection and analysis of data collected from transactions.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for performing in-flight transformations of data streams in order to perform complex event processing (CEP).

Many businesses, such as banks, social media platforms, telecommunication providers, and so forth, have access to vast troves of data created by users performing various transactions. This transaction data can be organized as data streams of events, in accordance with an embodiment. It is possible to analyze these events in order to reach some sort of conclusion from the events that are occurring.

CEP takes this analysis to the next level, with the goal of reaching conclusions about the events as quickly as possible, often in as close to real-time as is feasible. The analysis in CEP may involve significantly more data, such as reaching conclusions based on multiple events across multiple different streams at the same time.

Typically, a CEP system performs a task, such as taking an action, triggering an alert, or writing new events to a database based on logic that acts on thousands or even millions of event records received in real-time, and usually during a very small window of time. These existing systems must process large amounts of incoming event records, possibly performing some minimal filtering that can be accomplished in that very small window of time, and then write everything to a data sink. Only once those processed event records have reached the data sink can additional complex operations and transformations be performed efficiently.

Such a typical CEP system implementation incurs a performance bottleneck during transformation of the event records, and makes inefficient use of memory, since the entire data stream of event records must be written to the data sink. Additionally, transformations performed on the event records in order to obtain whatever view of the data stream is needed for analysis are performed after the entire stream has been consumed. As a result, systems that rely on these event records must also ensure that the data read from the data stream is the most up to date, and is ready to be read.

This complication is further compounded if event records of interest are gathered from across multiple data streams. When reading from multiple data streams, the CEP system must track the streams to ensure concurrency, potentially wasting even more memory and processing power to store all of the multiple data streams to the data sink—most of the data in these multiple data streams ultimately going unused.

Figure 1:
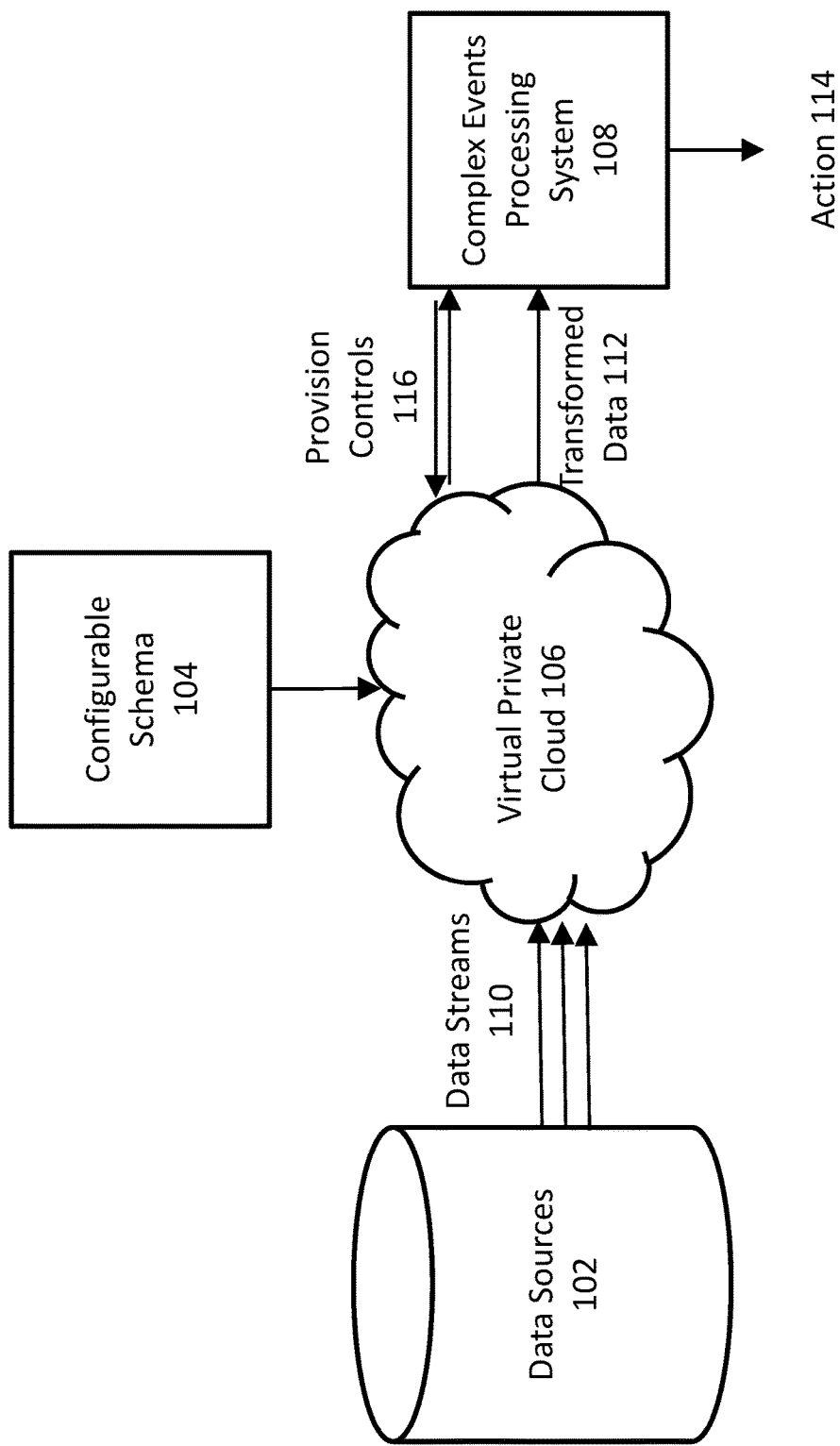
FIG. 1 illustrates a system for performing in-flight transformations of a data stream of event records, in accordance with an embodiment.

FIG. 1 illustrates a system 100 for performing in-flight transformations of a data stream of event records, in accordance with an embodiment. System 100 includes data streams 110 of event records streaming from data sources 102 (e.g., one or more databases) for use by CEP system 108, in accordance with an embodiment. CEP system 108 is able to analyze data streams 110 in order to decide on some task to perform, such as action 114.

CEP system 108, in order to perform its analysis of the event records in data streams 110, often needs to perform data transforms on the event records. For example, CEP system 108 may scan multiple data streams 110 in order to detect credit card fraud—and if CEP system 108 does detect credit card fraud, it can take an appropriate action 114, such as locking the associated credit card account.

The types of event records in data streams 110 that are usable in such a scenario are wide and varied. For example, one such data stream of data streams 110 may be a transaction stream including event records associated with every purchase made across all credit cards issued by a bank. Another such data stream of data streams 110 may include clickstream data corresponding to users' navigation of the bank's user profile update area on a bank website. And yet another such stream of data streams 110 may include location data for users connected to the bank via a mobile application.

In order to determine relationships between the data in these various streams, normally CEP system 108 would need to consume the event records from data streams 110 and store the event records in a database. This database can be queried in order to obtain relationships across the event records of multiple streams—for example, it may be possible to use a common client identifier (e.g., a 'ClientID' field) to associate purchases made by a particular bank customer from one stream with profile modifications made on the bank website to the customer's profile. In this case, all of the event records in the relevant data streams can be uniquely cross-referenced with the ClientID. Similarly, location data for the particular customer may be selected from another data stream and associated with the customer's purchases and profile modification information.

Querying the database storing the consumed event records can involve any number of query types in order to obtain the data from data streams 110. In the above example, this result can be achieved by a join operation on the three datasets using the common ClientIDs. One skilled in the relevant arts will appreciate that other query operations are contemplated within the scope of this disclosure, including filter and aggregate operations. This query results in a data transformation of the original event records.

With the relevant event records joined together (e.g., joined into a single table), CEP system 108 can perform its analysis in a straightforward manner. For example, CEP system 108 can now look at the transformed data to determine whether a particular customer (identified by a ClientID) made a transaction at a merchant (identified by the purchase records) located somewhere other than where the customer's mobile device was located (identified by the mobile app location data), for example. And CEP system 108 can also consider whether the customer's profile information was recently modified. All of this information, now held together for rapid analysis in a data structure grouped together by ClientID, can be rapidly addressed, retrieved, and analyzed by CEP system 108.

However, as previously noted, in order to perform this analysis the data streams 110 had to first be consumed and their event records stored in a database that could be queried. This consumption of streams, storage in a database, and subsequent querying of the database is costly. At a minimum, analysis of data streams 110 is unlikely to be performable in real-time (or perhaps even in near real-time) because of delays in gathering the stream and storing the event records.

In contrast, system 100 allows CEP system 108 to query data streams 110 directly through the use of a virtual private cloud 106, in accordance with an embodiment. Rather than first consuming the data streams 110, virtual private cloud 106 is able to transform (e.g., join, filter, aggregate, etc.) event records in data streams 110, such that CEP system 108 receives transformed data 112 as a stream with precisely the data elements needed for its analysis, in real-time or near real-time.

In an embodiment, data streams 110 streamed from data sources 102 are structured to conform to configurable schema 104. Configurable schema 104 may define, in an embodiment, data organization for a corresponding data stream of data streams 110 in an attribute-value pair comprised of multiple hierarchical levels. For example, a configurable schema 104 corresponding to the data stream providing customers' purchase information may include attributes such as ClientID, date, merchant, and amount, with corresponding values for each event record (e.g., purchase) made by customers. In accordance with an embodiment, configurable schema 104 is provided to virtual private cloud 106 in order to instruct the virtual private cloud 106 (i.e., an application executing on virtual private cloud 106) on how to consume data streams 110. Configurable schema 104 may also specify what actions to take over data streams 110 when consumed.

Virtual private cloud 106 can perform queries directly on data streams 110, in accordance with an embodiment, by defining query operations performed on the various attributes of data streams 110. In accordance with an embodiment, data streams 110 can be provisioned by creation or modification of a configurable schema, allowing a developer control over the granularity of the data streams 110. The queries can specify as many or as few of the attributes of a given data stream of data streams 110 for inclusion in transformed data 112 as needed for processing by CEP system 108.

Virtual private cloud 106 can be scaled in order to ensure the appropriate level of resources are dedicated to accessing data streams 110 in a real-time or near real-time manner, in accordance with an embodiment. For example, if there is an increase in the number of event records arriving via data streams 110, then virtual private cloud 106 may devote additional processing resources to handling the data streams 110. In contrast, virtual private cloud 106 may devote fewer processing resources to handling the data streams 110 if the resources are not needed, in order to save costs. In accordance with an embodiment, provision controls 116 allow CEP system 108 to determine whether to increase or decrease the available processing resources, although one skilled in the relevant arts will appreciate that this task may be handled by a separate component from CEP system 108.

System 100 has many varied uses for improved data processing. For example, a consumer bank may collaborate with a specific retail entity to offer branded credit cards that appeal to users with very specific interests. The retail entity, consumer bank, and card providers have an interest in maximizing usage of those cards by offering their customers specific and context-relevant rewards. By combining historical purchase patterns from multiple retail partner cards, generalized real-time location, comparable demographic specific accounts, and other real-time events provided in a variety of data streams 110, system 100 may build a more accurate, faster, and computationally efficient propensity-to-buy profile for a customer, and in turn, offer better, context-relevant rewards and offers.

By ingesting internal and external data streams into virtual private cloud 106, computation can be parallelized, and resiliency in multiple regions can be maintained, while continuously applying business logic in real-time. Data streams 110, including historical data from multiple card partners and/or data sources, may be aggregated and considered concurrently in real-time. Moreover, the system may be adapted and customized more quickly than other systems to expand or completely change the business logic behind card offers, spot discounts, and other rewards.

Figure 2:
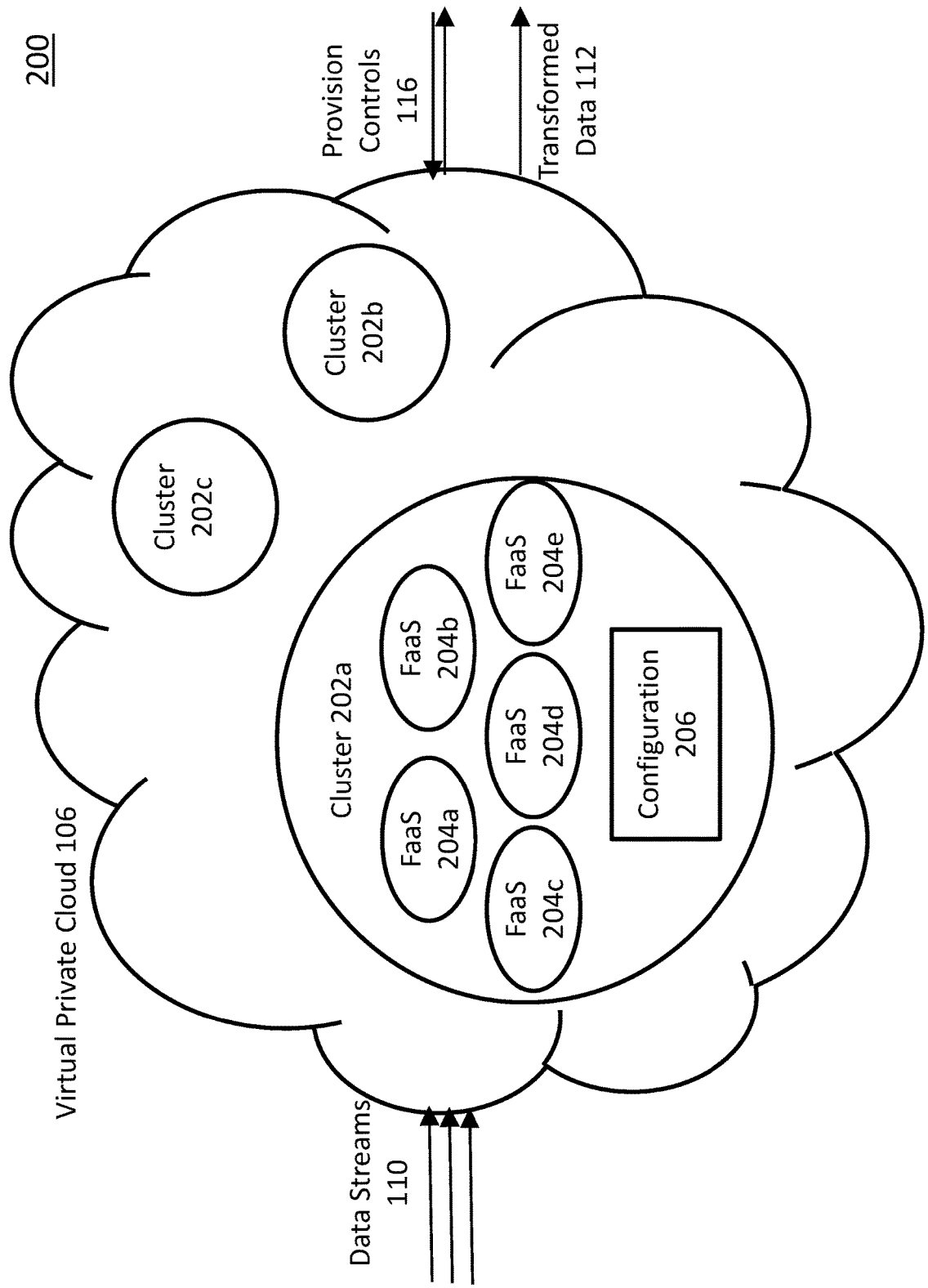
FIG. 2 illustrates a serverless architecture for performing in-flight transformations of a data stream of event records, in accordance with an embodiment.

FIG. 2 illustrates a serverless architecture 200 for performing in-flight transformations of a data stream of event records, in accordance with an embodiment. As in system 100 of FIG. 1, virtual private cloud 106 ingests data streams 110 and provides transformed data 112 as an output stream in real-time or near real-time. However, virtual private cloud 106 has been expanded in FIG. 2 in order to illustrate details of serverless architecture 200, in accordance with an embodiment.

In accordance with an embodiment, virtual private cloud 106 performs transformations on data streams 110 by allocating a cluster, such as cluster 202a, 202b, or 202c, to processing a given stream of data streams 110. Each cluster includes at least one processing node configured to ingest a data stream and perform a transformation on the data stream according to an expression language.

In an embodiment, the processing node is implemented as a Function as a Service (FaaS) instance, such as FaaS 204a-204e. Configuration 206 holds information used to instantiate each FaaS instance 204a-204e. In accordance with an embodiment, each FaaS instance 204a-204e performs identical tasks on a given stream segment (also called a fragment) of a stream handled by cluster 202a, and therefore is instantiated using the same configuration provided by configuration 206 as other FaaS instances 204a-204e.

As a data stream of data stream 110 is received at cluster 202a, the data stream is segmented into stream segments. In accordance with an embodiment, the data stream is segmented based on a number of event records, so that each stream segment is roughly equivalent in size. A stream segment is then handed to a particular FaaS instance, such as FaaS instance 204a, for processing.

FaaS instance 204a processes the stream segment by performing a query on the event records in the stream segment. As in system 100 of FIG. 1, each data stream of data streams 110 is defined in accordance with a configurable schema 104—therefore each stream segment may be queried on the basis of this configurable schema 104. FaaS instance 204a performs the query as defined by configuration 206, in accordance with an embodiment. In accordance with a further embodiment, this query is defined in an expression language, which instructs FaaS instance 204a (and all other FaaS instances 204b-204e of cluster 202a via configuration 206) to perform a specific data transform on the event records of their respective stream segment.

In an embodiment, clusters 202a-202c are built on a serverless architecture as a group of FaaS instances for scalability reasons, facilitating the consumption of multiple streams across clusters. Each cluster 202a-202c is aware of its own load based on an amount of data coming in from a respective stream, and can report this to a load manager via provision controls 116. In accordance with an embodiment, the load manager is CEP system 108 of FIG. 1, as previously discussed, but one skilled in the relevant arts will appreciate that the load manager functionality need not be integral to CEP system 108 of FIG. 1. The load manager can instruct clusters 202a-202c to provision additional or fewer resources, such as by instantiating additional FaaS instances 204a-204e or terminating existing instances, by providing such instructions over provision controls 116.

The data transformation performed by each FaaS instance 204a-204e of a cluster 202a can be stored as an expression in configuration 206. In accordance with an embodiment, the data transformation is defined as a query on attributes of event records in data streams 110, where the attributes are defined by a configurable schema 104 of FIG. 1. In order to simplify the generation of this expression, the configurable schemas 104 associated with each of the data streams 110 may be presented in a user interface whereby a user may select attributes of the configurable schemas 104 and a particular data transformation to perform on those attributes. From this selection, the expression may be generated that performs the particular data transformation on those attributes.

In accordance with an embodiment, the data transformation performed by a FaaS instance 204a-204e may ingest data in addition to data from a respective data stream associated with cluster 202a. For example, an associated expression may access an external data source, including an external database, another cluster (such as cluster 202b or 202c), or an additional data stream. One skilled in the relevant arts will appreciate that the specific data manipulations that can be performed by an FaaS instance 204a-204e on a given stream segment includes a large number of options that will be apparent based upon this disclosure.

As a result of processing data streams 110 through virtual private cloud 106, transformed data 112 is provided to a data sink in real-time or near real-time with the data that is needed by the data sink (e.g., by CEP system 108 of FIG. 1).

A relevant analogy here is that processing data streams 110 through virtual private cloud 106 is like going from a fire hose to a garden hose—only the data actually needed by the data sink is kept, and is streamlined in the process.

Figure 3:
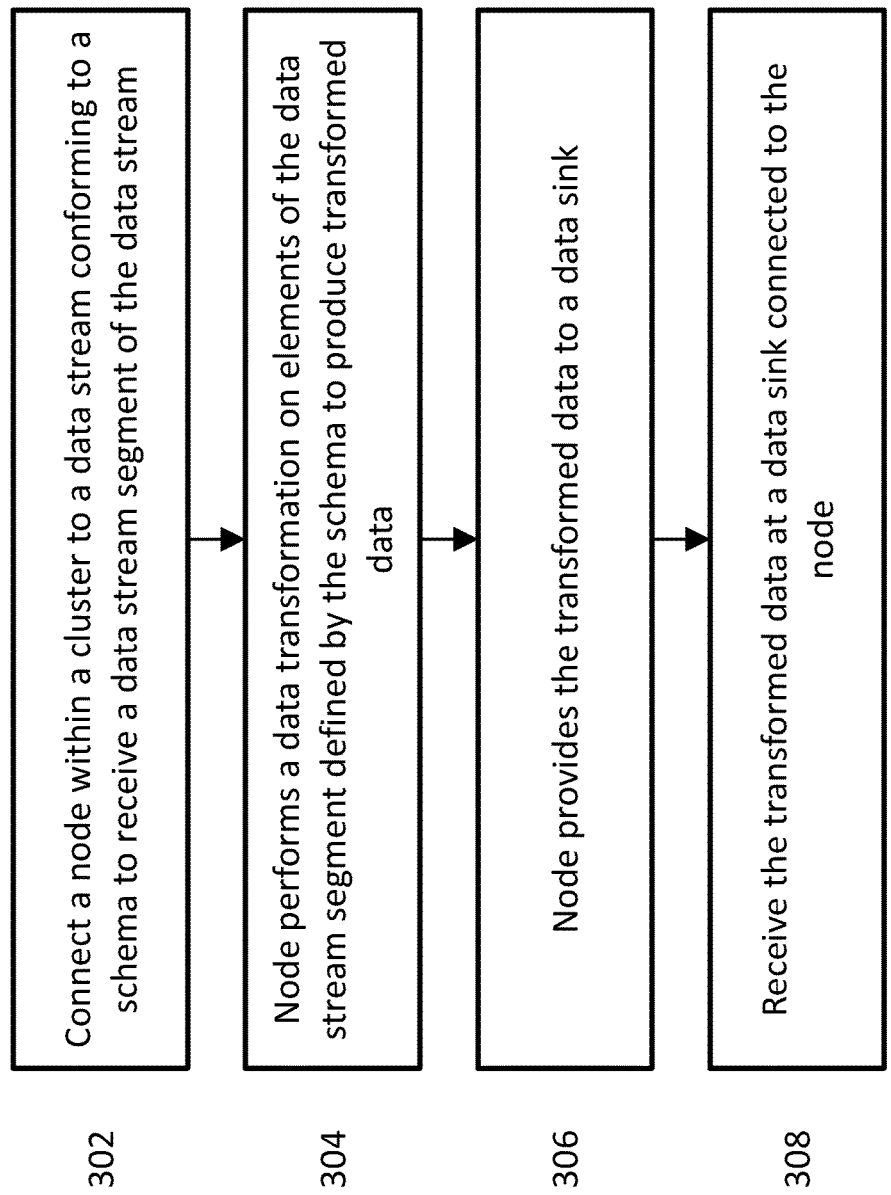
FIG. 3 is a flowchart illustrating steps by which in-flight transformation is performed using a serverless architecture, in accordance with an embodiment.

FIG. 3 is a flowchart 300 illustrating steps by which in-flight transformation is performed using a serverless architecture, in accordance with an embodiment. The process begins at step 302, where a node within a cluster is connected to a particular data stream (associated with a schema) to receive a data stream segment of that data stream. In accordance with an embodiment, the node is provisioned if it has not already been provisioned. For example, with continued reference to FIG. 2, a node such as FaaS 204a within cluster 202a receives a segment of a data stream of data streams 110 that is associated with cluster 202a.

At step 304, the provisioned node performs a data transformation on elements of the data stream segment defined by the schema to produce transformed data. For example, FaaS 204a is configured to carry out a particular data transformation on event records of its associated data stream segment. In provisioning FaaS 204a, configuration 206 provides FaaS 204a with an expression used to carry out the particular data transformation. This expression is defined on attributes of the schema of the data stream.

At step 306, the node provides the result of this data transformation, itself a portion of a new stream, to a data sink based on the node's configuration. The data sink receives the transformed data at step 308 for further processing.

Figure 4:
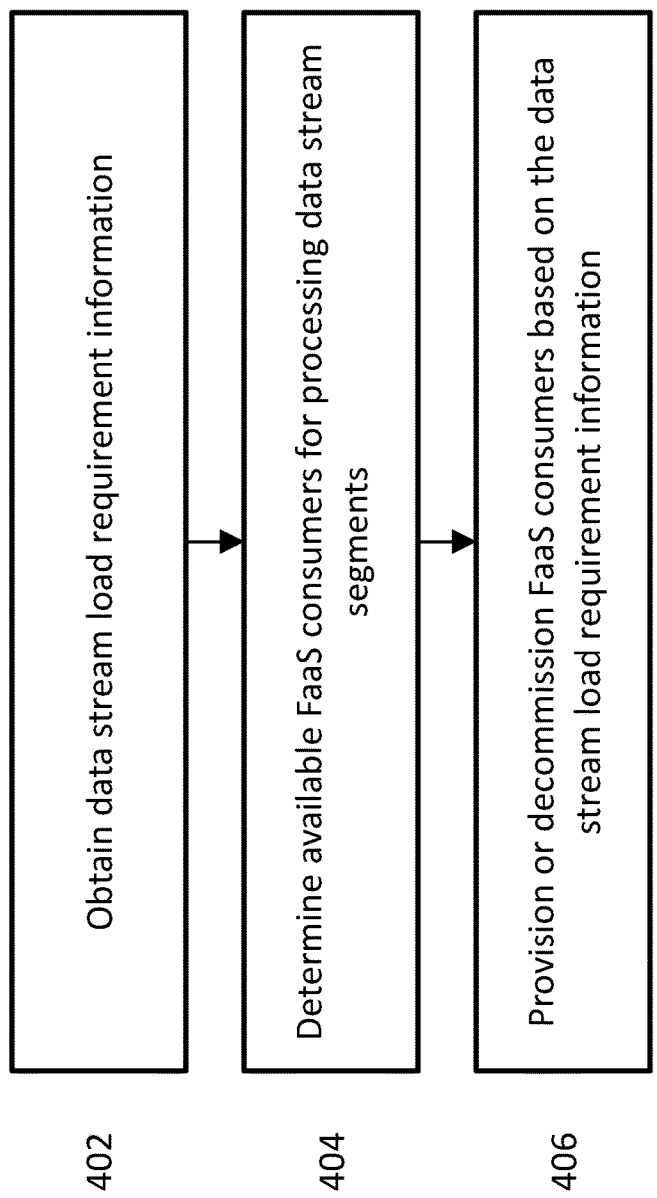
FIG. 4 is a flowchart illustrating steps by which availability requirements of a serverless architecture can be met, in accordance with an embodiment.

FIG. 4 is a flowchart 400 illustrating steps by which availability requirements of a serverless architecture can be met, in accordance with an embodiment. In accordance with an embodiment, the steps of flowchart 400 can be performed by CEP system 108 of FIG. 1, although one skilled in the relevant arts will appreciate that the steps may also be performed by a separate component configured to manage a load in the serverless architecture, such as virtual private cloud 106.

The process begins at step 402 where data stream load requirement information is obtained. This data stream load requirement information may specify, by way of non-limiting example, a quantity of event records being provided on a given data stream over a period of time, from which an increase or decrease in the data stream's load requirement may be known or inferred. At step 404, a number of available nodes (e.g., FaaS 204a-204e of FIG. 2) is determined. Information regarding the load status of virtual private cloud 106 may be exchanged over provision controls 116, and can include information regarding the availability of clusters, such as clusters 202a-202c, and of individual nodes within the clusters, such as FaaS 204a-204e.

At step 406, the load requirements obtained in step 402 can be assessed against the available nodes determined in step 404, in accordance with an embodiment. Based on this assessment, additional nodes may be provisioned, or some nodes may be decommissioned.

Figure 5:
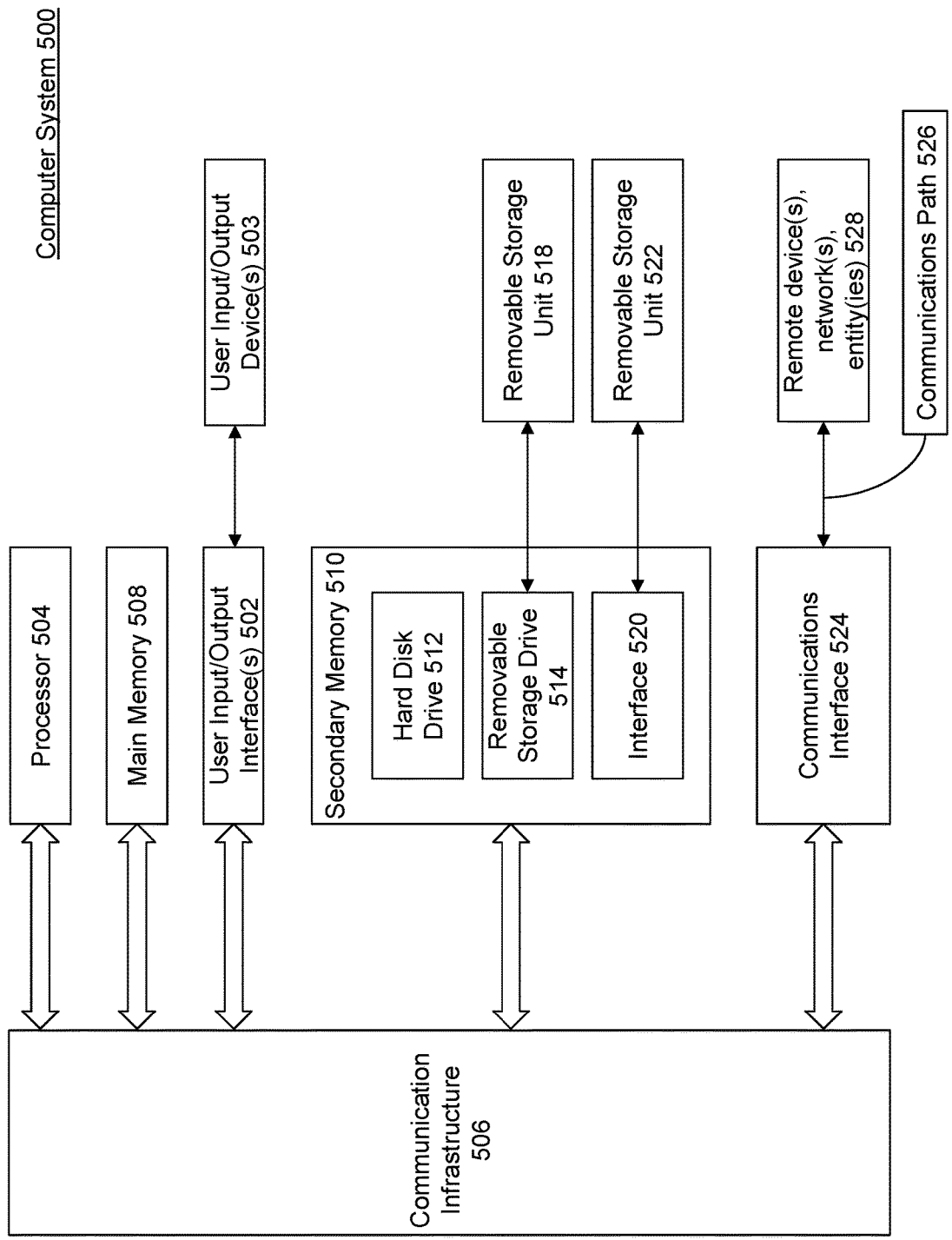
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (also sometimes referred to as FaaS, which is different from the Function as a Service FaaS disclosed elsewhere in this specification), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   connecting, by one or more computing devices, a plurality of nodes within a cluster to a data stream conforming to a schema, each of the plurality of nodes is configured to receive each of a plurality of data stream segments segmented based on a number of an event record from the data stream; provisioning, by the one or more computing devices, the plurality of nodes to perform a data transformation on elements of the plurality of data stream segments as defined by the schema, the data transformation produces transformed data by performing a query defined by the schema of the cluster where the plurality of nodes exists, the query is performed directly through a cloud service before the data stream is directly received by a data sink, and the schema defines a data organization of the plurality of data stream segments to include client ID, date, merchant, and amount corresponding to the event record; and receiving, by the one or more computing devices, the transformed data at the data sink connected to the plurality of nodes.

2. The computer implemented method of claim 1, wherein a complex events processing system executing on the one or more computing devices is configured to act as the data sink and to perform an action based on the transformed data.

3. The computer implemented method of claim 1, wherein the query comprises an operation performed on the elements of a data stream segment and on additional elements of an additional data stream segment.

4. The computer implemented method of claim 1, further comprising:
   obtaining, by the one or more computing devices, load requirement information of the data stream; and
   notifying, by the one or more computing devices, the cluster to adjust node availability based on load requirements of the data stream.

5. The computer implemented method of claim 1, further comprising:
   creating, by the one or more computing devices, a configuration file specifying configuration information for the plurality of nodes and one or more additional nodes within the cluster.

6. The computer implemented method of claim 1, wherein the plurality of nodes is configured as a function as a service (FaaS) consumer.

7. The computer implemented method of claim 1, wherein the event record is a record of a purchase event made by a customer using a credit card.

8. A system, comprising:
   a memory configured to store operations; and
   one or more processors configured to perform the operations, the operations comprising:
      connecting a plurality of nodes within a cluster to a data stream conforming to a schema, wherein each of the plurality of nodes is configured to receive each of a plurality of data stream segments segmented based on a number of an event record from the data stream,
      provisioning the plurality of nodes to perform a data transformation on elements of the plurality of data stream segments as defined by the schema, wherein the data transformation produces transformed data by performing a query defined by the schema of the cluster where the plurality of nodes exists, the query is performed directly through a cloud service before the data stream is directly received by a data sink, and the schema defines a data organization of the plurality of data stream segments to include client ID, date, merchant, and amount corresponding to the event record; and
      receiving the transformed data at the data sink connected to the plurality of nodes.

9. The system of claim 8, wherein a complex events processing system executing on the one or more processors is configured to act as the data sink and to perform an action based on the transformed data.

10. The system of claim 8, wherein the query comprises an operation performed on the elements of a data stream segment and on additional elements of an additional data stream segment.

11. The system of claim 8, the operations further comprising:
    obtaining load requirement information of the data stream; and
    notifying the cluster to adjust node availability based on load requirements of the data stream.

12. The system of claim 8, the operations further comprising:
    creating a configuration file specifying configuration information for the plurality of nodes and one or more additional nodes within the cluster.

13. The system of claim 8, wherein the plurality of nodes is configured as a function as a service (FaaS) consumer.

14. The system of claim 8, wherein the event record is a record of a purchase event made by a customer using a credit card.

15. A computer readable storage device having instructions stored thereon, execution of which, by one or more processing devices, causes the one or more processing devices to perform operations comprising:

connecting a plurality of nodes within a cluster to a data stream conforming to a schema, wherein each of the plurality of nodes is configured to receive each of a plurality of data stream segments segmented based on a number of an event record from the data stream;

provisioning the plurality of nodes to perform a data transformation on elements of the plurality of data stream segments as defined by the schema, wherein the data transformation produces transformed data by performing a query defined by the schema of the cluster where the plurality of nodes exists, the query is performed directly through a cloud service before the data stream is directly received by a data sink, and the schema defines a data organization of the plurality of data stream segments to include client ID, date, merchant, and amount corresponding to the event record; and receiving the transformed data at the data sink connected to the plurality of nodes.

16. The computer readable storage device of claim 15, wherein a complex events processing system executing on the one or more processing devices is configured to act as the data sink and to perform an action based on the transformed data.

17. The computer readable storage device of claim 16, wherein the query comprises an operation performed on the elements of a data stream segment and on additional elements of an additional data stream segment.

18. The computer readable storage device of claim 15, the operations further comprising:
obtaining load requirement information of the data stream; and
notifying the cluster to adjust node availability based on load requirements of the data stream.

19. The computer readable storage device of claim 15, the operations further comprising:
creating a configuration file specifying configuration information for the plurality of nodes and one or more additional nodes within the cluster.

20. The computer readable storage device of claim 15, wherein the event record a record of a purchase event made by a customer using a credit card.

* * * * *